Patented Aug. 17, 1937

2,090,418

UNITED STATES PATENT OFFICE 2,090,418

METHOD OF TREATING MATERIAL FOR SEPARATION

Fred R. Johnson, Buffalo, N. Y.

No Drawing. Application April 22, 1935,
Serial No. 17,573

3 Claims. (Cl. 209—127)

This invention relates generally to the art of separation and more particularly to the treating or conditioning of the material for electrostatic separation.

In the art of electrostatic separation it has long been recognized that separation is assisted by presenting the materials to be treated in a perfectly dry state and to heat the materials before they are introduced to the separator.

It is the object of my invention to provide a novel method of conditioning the material for electrostatic separation so that the surface of the material is rendered conductive or non-conductive to produce maximum selective action and efficient separation when introduced into the electrostatic field of the separator.

Another object is the provision of a conditioning treatment for non-metallic materials containing free silica undergoing electrostatic separation which employs the use of an acid of the fluorine radical to render the material particles selectively susceptible to an electrostatic field, and wherein the material so treated is dried and then delivered to the separator in either a hot or cold condition.

In carrying out my improved method of treating or conditioning material to increase its conductivity, or conversely its non-conductivity, and thereby increase to a maximum the selective action of the material when the same is introduced into a separating zone of an electrostatic field, I have found that very efficient and constant results are obtained by subjecting the material to be separated to the action of chemical reagents converted or sublimated to a fluid condition. This fluid reagent, in a vapor or liquid state, is brought into intimate contact with the material and, depending upon the nature of the material as to its reaction to a particular reagent, the material is given a surface-conditioning which renders the material either conductive or non-conductive to an electrostatic charge when delivered to the separator. After the fluid treatment, the material is then thoroughly dried in any appropriate manner to remove any moisture or condensate and the dry material is then delivered in any well known way to the electric separator. In some cases, the dry material may be heated or delivered in a cool condition to the separator.

In practising my invention, the material to be conditioned may be delivered to a chamber or conduit into which the treating fumes or vapor from the reagent are introduced, after which the conditioned material is directed to an electrostatic separator of any suitable and well known construction. For example, a suitable apparatus for separating the material is shown in my United States Patent No. 1,551,397, dated August 25, 1925.

As examples of organic matter which have been converted into a vapor or gas for conditioning the material, I have found resorcinol, camphor and naphthalene very effective; inorganic matter, such as ammonium chloride, ammonium sulphate, and sulphur, when sublimated into a vapor or fume have also increased the conductivity of various materials and augmented their selective action when introduced into an electrostatic separating field or zone. I have also produced effective results with vapors from acids containing a fluorine radical, such as hydrofluoric, as well as from hydrochloric and carbonic, and from such gasses as chlorine, bromine and sulphur dioxide. These types of reagents may be used dry, that is, free from water or other solvent, or they may be dissolved in water or other solvents as a carrier, and then after fluid-contact with the reagent to render the surface of the material conductive or non-conductive, the material is dried and thence delivered hot or cold to the separator. If desired, the organic and inorganic reagents may be dissolved in water or other solvent and the material to be treated immersed therein and then sufficiently dried before being delivered to the electrostatic separating zone.

In treating feldspar ore containing quartz for increasing the selective or separating action, very effective results have been obtained with hydrochloric and hydrofluoric reagents. As examples of other substances which may be electrostatically separated after preliminary treatment by the reagents specified in the preceding paragraph, I might mention kyanite from quartz and other impurities, manganese from free silica, phosphate rock from quartz and other impurities, and zircon from rutile and ilemite.

In effecting the separation of felspar from quartz, hydrofluoric and hydrochloric acids as reagents produce efficient results. When using hydrofluoric acid the surface conditioning of the quartz is such that it is rendered more conductive than the felspar, while in the use of hydrochloric acid the felspar is rendered more conductive than the quartz, with the result that when introduced into the electrostatic separating field the relative selective action is increased and the separation efficiently performed.

By this improved method of conditioning materials for electrostatic separation, the results produced are constant and efficient separation is assured. Furthermore, the action of the fluid reagents on the material increases the conductivity or non-conductivity of the material with the result that the number of runs or passes of the material through the electrostatic separating zones is reduced to a minimum and the separating units may be accordingly reduced in size and thereby effect a material saving in installation and maintenance costs.

In cases where the materials to be separated may be inherently conductive or non-conductive, then by my method, one of the materials may be subjected to a surface conditioning by a reagent particularly adaptable to such material so as to render it opposite in characteristic to the other material or materials.

I claim as my invention:—

1. Method of concentrating non-metallic minerals containing free silica which comprises treating the particles with an acid containing a fluorine radical to render the particles selectively susceptible to an electrostatic field, and passing the treated particles through an electrostatic separator under conditions to cause the free silica particles to segregate and to be removed from the remaining constituents.

2. Method of concentrating non-metallic minerals containing free silica which comprises treating the particles with an acid containing a fluorine radical to render the particles selectively susceptible to an electrostatic field, drying the acid-treated material, and then passing the treated particles through an electric separating field under conditions to cause the free silica particles to segregate and to be removed from the remaining constituents.

3. Method of concentrating non-metallic minerals containing free silica which comprises treating the particles hot or cold with an acid containing a fluorine radical to render the particles selectively susceptible to an electrostatic field, drying the acid-treated material by a heating process to remove the moisture, and then passing the material while hot through an electrostatic separator under conditions to cause the free silica particles to segregate and to be removed from the remaining constituents.

FRED R. JOHNSON.